US007058389B2

(12) United States Patent
Chin et al.

(10) Patent No.: US 7,058,389 B2
(45) Date of Patent: Jun. 6, 2006

(54) METHOD FOR PROCESSING EMERGENCY CALLS INITIATED BY WIRELESS PHONES

(75) Inventors: Mary Wonmon Chin, Westmont, IL (US); Stuart Owen Goldman, Scottsdale, AZ (US); Douglas Harold Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 228 days.

(21) Appl. No.: 10/390,103

(22) Filed: Mar. 17, 2003

(65) Prior Publication Data

US 2004/0185823 A1   Sep. 23, 2004

(51) Int. Cl.
*H04Q 7/20* (2006.01)
(52) U.S. Cl. .................... 455/410; 455/403
(58) Field of Classification Search ............. 455/410, 455/404, 527, 411, 403, 521
See application file for complete search history.

(56) References Cited

U.S. PATENT DOCUMENTS

| | | | | |
|---|---|---|---|---|
| 5,563,931 A | * | 10/1996 | Bishop et al. | 455/404.1 |
| 5,765,107 A | * | 6/1998 | Korowajczuk | 455/410 |
| 5,956,634 A | * | 9/1999 | Otterson et al. | 455/410 |
| 6,038,440 A | * | 3/2000 | Wu | 455/410 |
| 6,047,174 A | * | 4/2000 | Frederick | 455/410 |
| 6,148,190 A | * | 11/2000 | Bugnon et al. | 455/404.1 |
| 6,594,481 B1 | * | 7/2003 | Johnson et al. | 455/410 |
| 6,633,754 B1 | * | 10/2003 | Raith | 455/404.1 |

OTHER PUBLICATIONS

"NENA Technical Information Document (TID) On PSAP Call Back to All 9-1-1 Callers, Combating Wireless E911 Fraud and Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pps. 1-51.

* cited by examiner

*Primary Examiner*—William J. Deane, Jr.
(74) *Attorney, Agent, or Firm*—Jimmy Goo

(57) ABSTRACT

Disclosed is a method of communicating emergency call information originating from wireless phones among multiple entities using a set of network signaling operations for pooling and reconciling records of emergency calls and identifications for sources of fraudulent calls. A set of network signaling operations is described herein for communicating records of emergency calls among network entities of same or different levels, and for communicating identified sources of fraudulent calls among network entities of same or different levels.

20 Claims, 12 Drawing Sheets

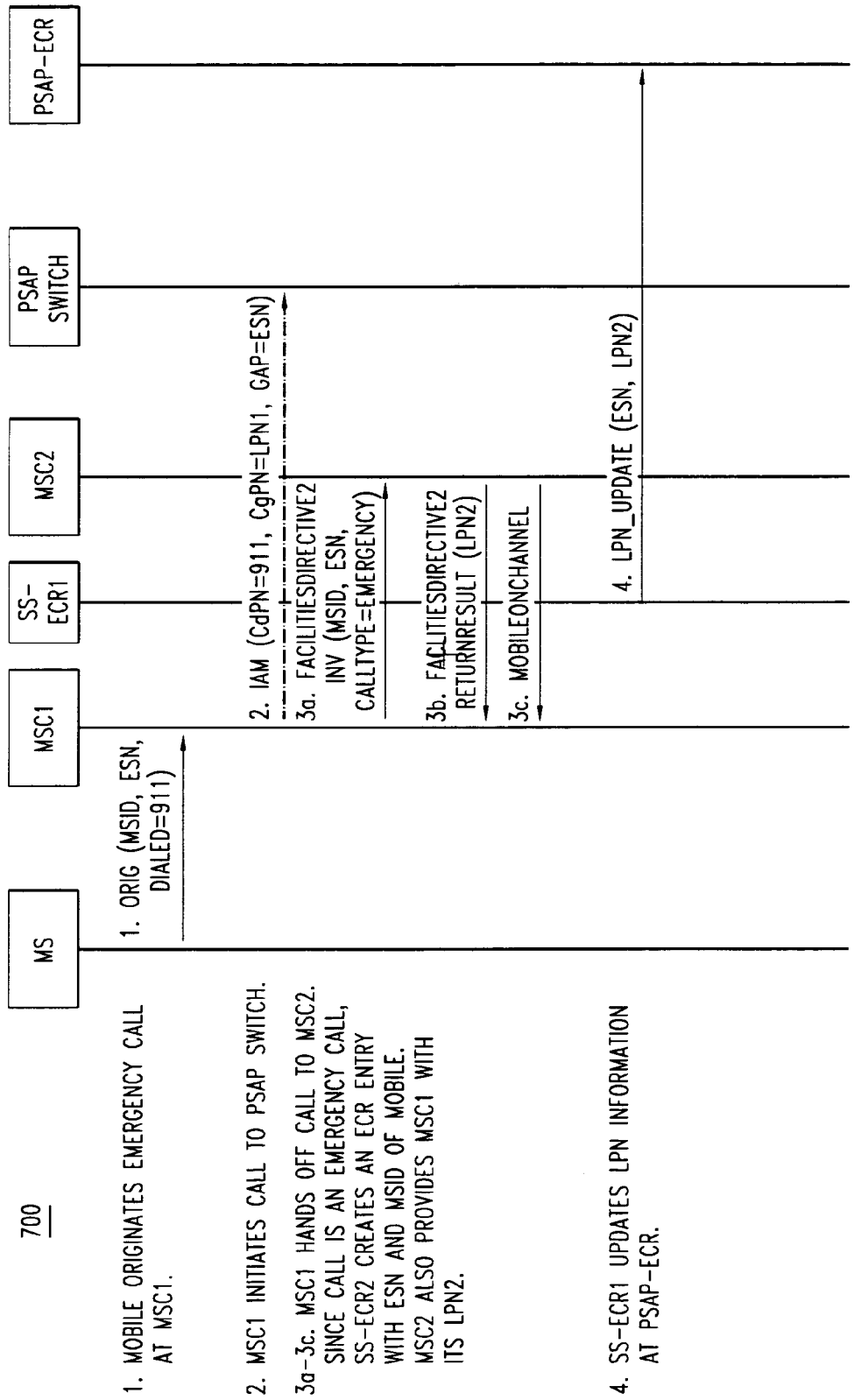

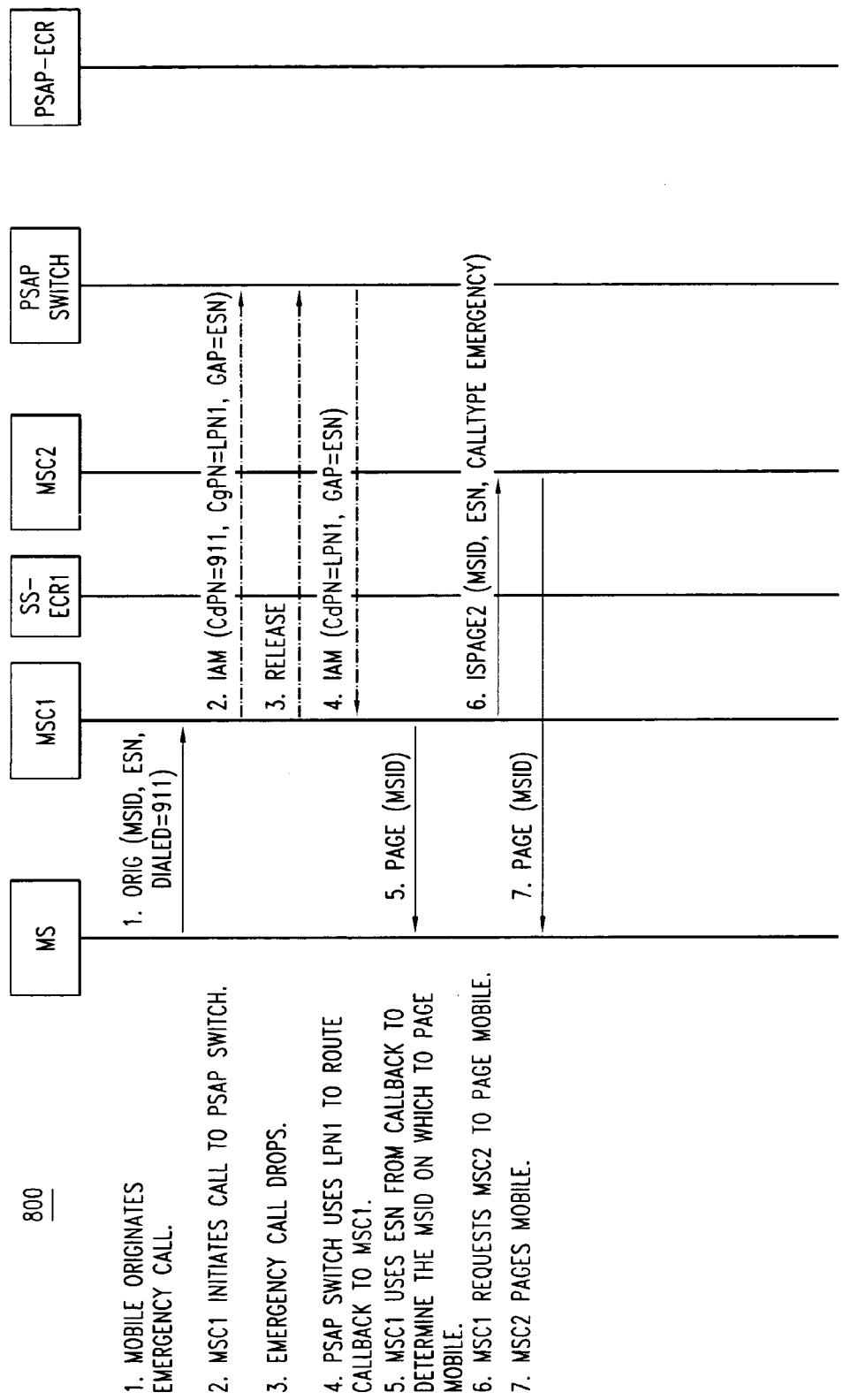

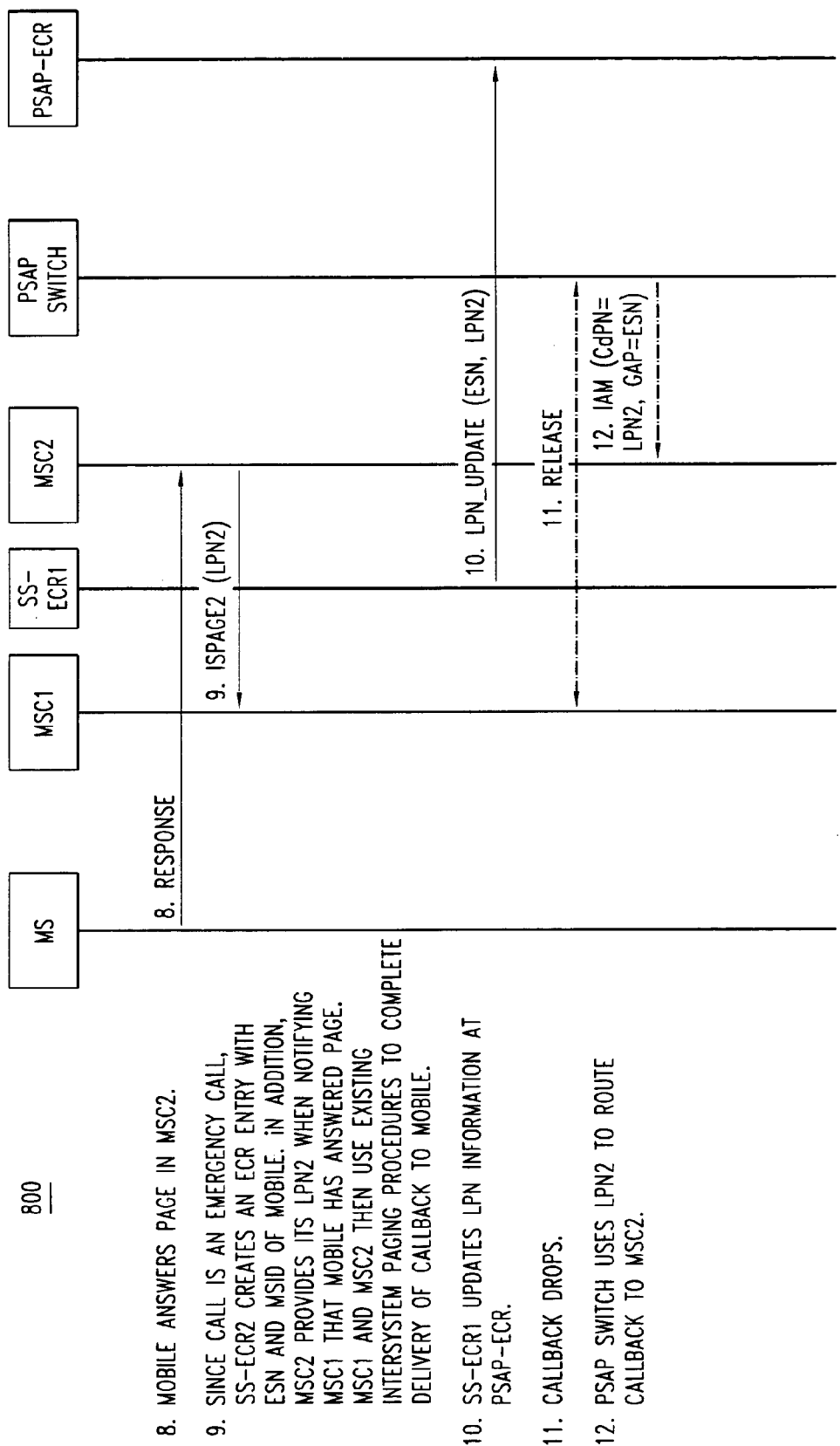

8. MOBILE ANSWERS PAGE IN MSC2.

9. SINCE CALL IS AN EMERGENCY CALL, SS-ECR2 CREATES AN ECR ENTRY WITH ESN AND MSID OF MOBILE. IN ADDITION, MSC2 PROVIDES ITS LPN2 WHEN NOTIFYING MSC1 THAT MOBILE HAS ANSWERED PAGE. MSC1 AND MSC2 THEN USE EXISTING INTERSYSTEM PAGING PROCEDURES TO COMPLETE DELIVERY OF CALLBACK TO MOBILE.

10. SS-ECR1 UPDATES LPN INFORMATION AT PSAP-ECR.

11. CALLBACK DROPS.

12. PSAP SWITCH USES LPN2 TO ROUTE CALLBACK TO MSC2.

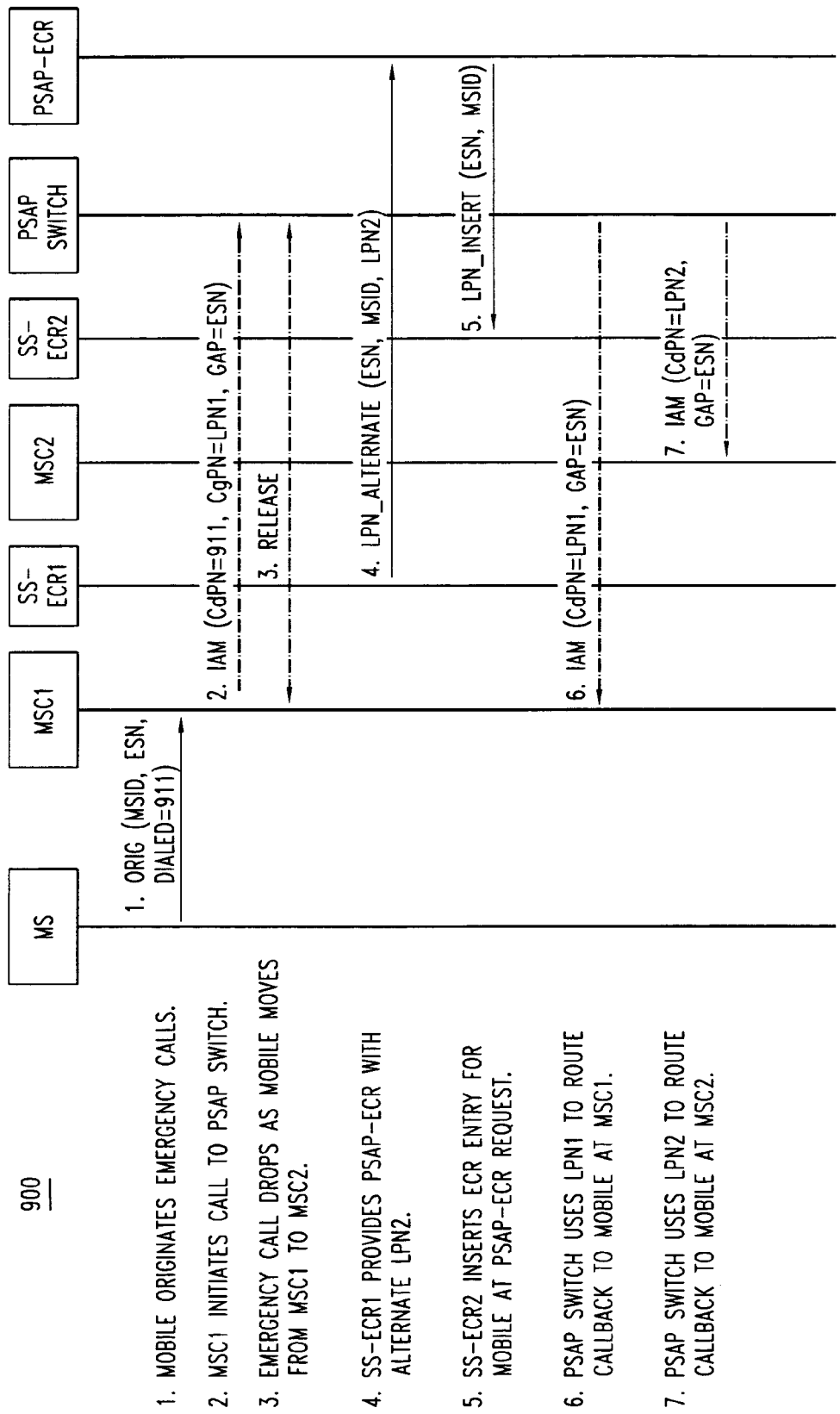

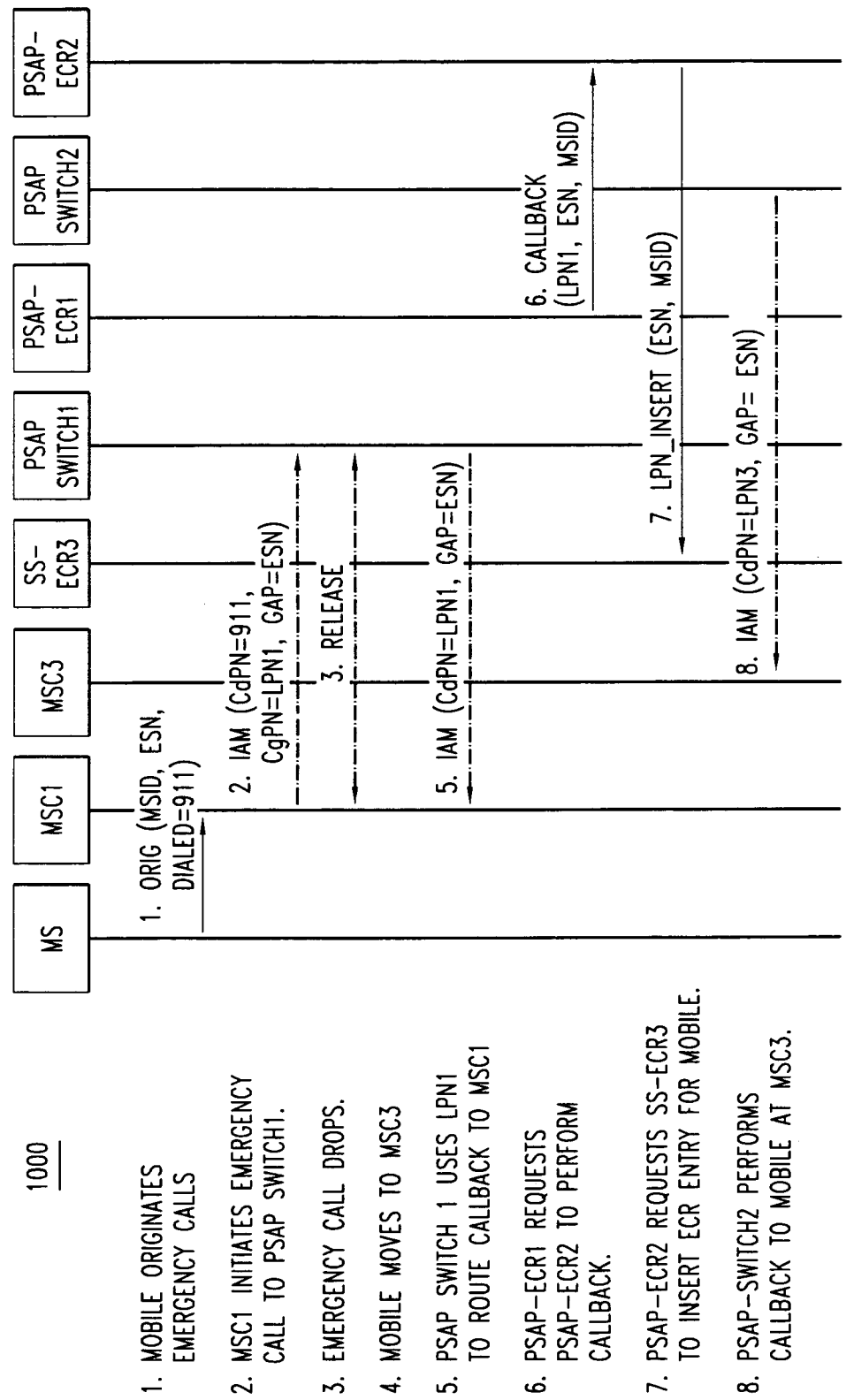

METHOD FOR PROCESSING EMERGENCY CALLS INITIATED BY WIRELESS PHONES

FIELD OF THE INVENTION

The present invention relates generally to wireless communications networks and, in particular, to processing of emergency calls in wireless communications networks.

BACKGROUND OF RELATED ART

Emergency service is often available to a caller by dialing an emergency number, which may be some abbreviated string of digits, such as 9-1-1. When an emergency number is dialed by a wireline phone, a switching office in the telephone network e.g., public switching telephone network (PSTN), maps the emergency number to the route of a local public safety answering point (PSAP) serving the community in which the phone is located, and subsequently routes the call to the local PSAP through the telephone network using the mapped route.

In a larger community, there may be more than one local PSAP serving that community. When there are more than one local PSAP, the switching office must select a particular local PSAP to which to route the emergency call. The selected PSAP would typically be the local PSAP serving an area from which the emergency call originated. This manner of selecting and routing an emergency call to a particular local PSAP is part of a service known as Enhanced 9-1-1 (E911). E911 is often implemented in an entity referred to as an Emergency Services Network (EmSN). E911 utilizes a database which associates directory numbers (DN) for each phone in the community to the identity of the PSAP assigned to serve or answer emergency calls from phones within that community. When an emergency call is initiated, a calling party number (CgPN) associated with the caller, i.e., phone from which the call originated, is signaled with the emergency call. The CgPN indicates a DN associated with the phone and is used to select the PSAP to answer the call from that phone. The call is subsequently routed through the telephone network and EmSN to the PSAP.

Fraud prevention may be implemented to prevent fraudulent emergency calls from wasting valuable resources used in response to legitimate emergency calls. Fraud prevention may include one or more techniques for identifying possible fraudulent emergency calls. One such technique involves determining an emergency call may be fraudulent if multiple emergency calls were originated from a same phone over a short time interval. This technique, however, was originally designed to identify possible fraudulent emergency calls from wireline phones, not wireless phones. The main difference between wireline phones and wireless phones is that wireline phones have fixed locations and wireless phones do not have fixed locations. For purposes of this application, the term wireless phones include mobile terminals and not cordless phones. This difference is a significant factor in identifying possible fraudulent emergency calls, as will be explained below.

As mentioned earlier, a PSAP serves a particular area. An emergency call from a phone within a particular area will only be routed to the PSAP associated with that area. Since a wireline phone has a fixed location, an emergency call from the wireline phone will only be routed to its associated PSAP, i.e., the PSAP serving the area in which the wireline phone is located. Due to this one-to-one correspondence between wireline phones and PSAPs, emergency calls from a particular wireline phone will only be received by the PSAP serving the area in which that wireline phone is located and recorded at an emergency call register (ECR) associated with that PSAP (hereinafter referred to as "PSAP-ECR").

By contrast, a wireless phone does not have a fixed location. There is no one-to-one relationship between wireless phones and PSAPs. When an emergency call is initiated by a wireless phone, the call is initially received by a serving mobile switching center (MSC). The MSC causes the call to be recorded at an ECR associated with the serving MSC (hereinafter referred to as "serving system ECR" or "SS-ECR") and at a PSAP-ECR associated with a PSAP serving the MSC (in the same manner which a PSAP serves a community or an area within a community). Note that there is a one-to-many relationship between PSAPs and MSCs, i.e., one PSAP may serve multiple MSCs. Because a wireless phone is mobile, the MSC serving the wireless phone will change as the wireless phone moves to a coverage area of another MSC. This second MSC may be served by another PSAP. Thus, emergency calls from a wireless phone can end up being routed to and recorded at more than one PSAP.

For example, if, after initiating a first emergency call and the call being subsequently recorded at a SS-ECR and a PSAP-ECR, the call is dropped. The wireless phone initiates a second emergency call. However, between the time the first call was dropped and the second call initiated, the wireless phone may have moved to a location being served by another MSC. When the second emergency call is received by this second MSC, the second MSC causes the second call to be recorded at its associated SS-ECR and at the PSAP-ECR associated with the PSAP serving the second MSC. However, if the first and second MSCs are served by different PSAPs, the second emergency call will be recorded at a second PSAP-ECR. In such a situation, the first and second PSAP-ECRs will not have a record of the second and first emergency calls, respectively, to use in identifying fraudulent calls from that wireless phone.

If the first and second MSCs are served by the same PSAP, the second emergency call will be recorded at the same PSAP-ECR where the record of the two emergency calls may be used in identifying fraudulent calls from that wireless phone. However, when the PSAP-ECR identifies the wireless phone as a source of fraudulent calls, no other PSAP-ECR will have any indication that this identification. Thus, if the wireless phone moves to a coverage area of a MSC being served by another PSAP, such PSAP would not know that the wireless phone has been identified as a source of fraudulent calls by another PSAP.

Accordingly, there exists a need to communicate records of emergency calls originating from wireless phones among multiple ECRs in order to better perform prevent fraud, and to communicate the identities of wireless phones which are the source of fraudulent emergency calls among multiple ECRs.

SUMMARY OF THE INVENTION

The present invention is a method of communicating emergency call information originating from wireless phones among multiple entities using a set of network signaling operations for pooling and reconciling records of emergency calls and identifications for sources of fraudulent calls. In one embodiment, the method of communicating emergency call information is performed at a wireless communications network, and comprises the steps of determining whether the wireless phone is a source of fraudulent calls, routing the emergency call to an emergency service network if the wireless phone is not identified as a source of fraudulent calls, and not routing the emergency call to the emergency service network if the wireless phone is identified as a source of fraudulent calls. If the wireless phone is identified as a source of fraudulent calls, the wireless communications network can send an alert message to a public safety answering point and/or route the call to a fraud control center.

In another embodiment, the method of communicating emergency call information is performed at a public safety answering point, and comprises the steps of determining whether the wireless phone is a source of fraudulent calls, routing the emergency call to a call center if the wireless phone is determined not to be a source of fraudulent calls, and not routing the emergency call to the call, center if the wireless phone is determined to be a source of fraudulent calls. If the wireless phone is identified as a source of fraudulent calls, the public safety answering point can send an alert message to a wireless communications network from which the call originated or to one or more other wireless communications network, and/or route the call directly or through a wireless communications network to a fraud control center.

BRIEF DESCRIPTION OF THE DRAWINGS

The features, aspects, and advantages of the present invention will become better understood with regard to the following description, appended claims, and accompanying drawings where

FIG. 8 depicts a flowchart illustrating network signaling operations for a SS-ECR providing a LPN update when a callback is delivered to a border serving MSC;

FIG. 9 depicts a flowchart illustrating network signaling operations for a SS-ECR providing a PSAP with alternate LPN; and FIG. 10 depicts a flowchart illustrating network signaling operations for a PSAP-ECR communicating with another PSAP-ECR to provide callback.

DETAILED DESCRIPTION

The present invention is a method of communicating emergency call information originating from wireless phones among multiple entities using a set of network signaling operations for pooling and reconciling records of emergency calls and identifications for sources of fraudulent calls. The present invention describes a set of network signaling operations for communicating records of emergency calls among network entities of same or different levels and for communicating identified sources of fraudulent calls among network entities of same or different levels.

Figure 1:
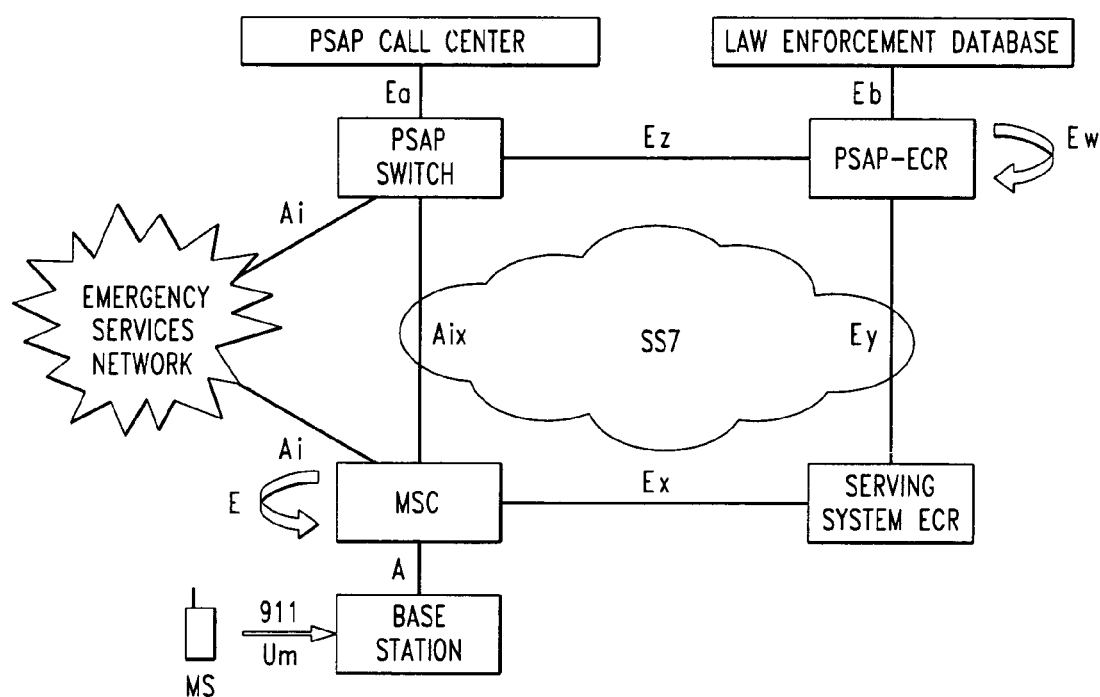
FIG. 1 depicts an exemplary architecture of a system for providing emergency call services and managing fraudulent emergency calls used in accordance with the present invention.

FIG. 1 depicts an exemplary architecture of a system 10 for providing emergency call services and managing fraudulent emergency calls used in accordance with the present invention. System 10 comprises a wireless communications system 12, an emergency services network (EmSN) 14, a public safety answering point (PSAP) 16, a transport network 18, and a law enforcement database (LE) 20. Wireless communications system 12 comprises a base station 22, a mobile switching center (MSC) 24 and a serving system emergency call register (SS-ECR) 26. PSAP 16 comprises a PSAP Switch 28, a PSAP emergency call register (PSAP-ECR) 30 and a PSAP call center 32. Both SS-ECR 26 and PSAP-ECR 30 implements a fraud prevention technique using a database having emergency service records (ESR) indicating how many emergency calls were initiated by mobile station 34 and when such emergency calls were initiated. Transport network 18 may be any network for transporting information, such as a SS7 network or a packet data network.

It should be understood that system 10 is merely one embodiment in which the present invention may be implemented. Other embodiments are possible. For example, SS-ECR 26 and PSAP-ECR 30 may be combined in PSAP 16 or wireless communications system 12. Or SS-ECR 26 and/or PSAP-ECR 30 may be owned and operated by a third party. Additionally, it should be understood that PSAP 16 may serve multiple wireless communications system 12 and that law enforcement database 20 may serve multiple PSAP 16.

Figure 2:
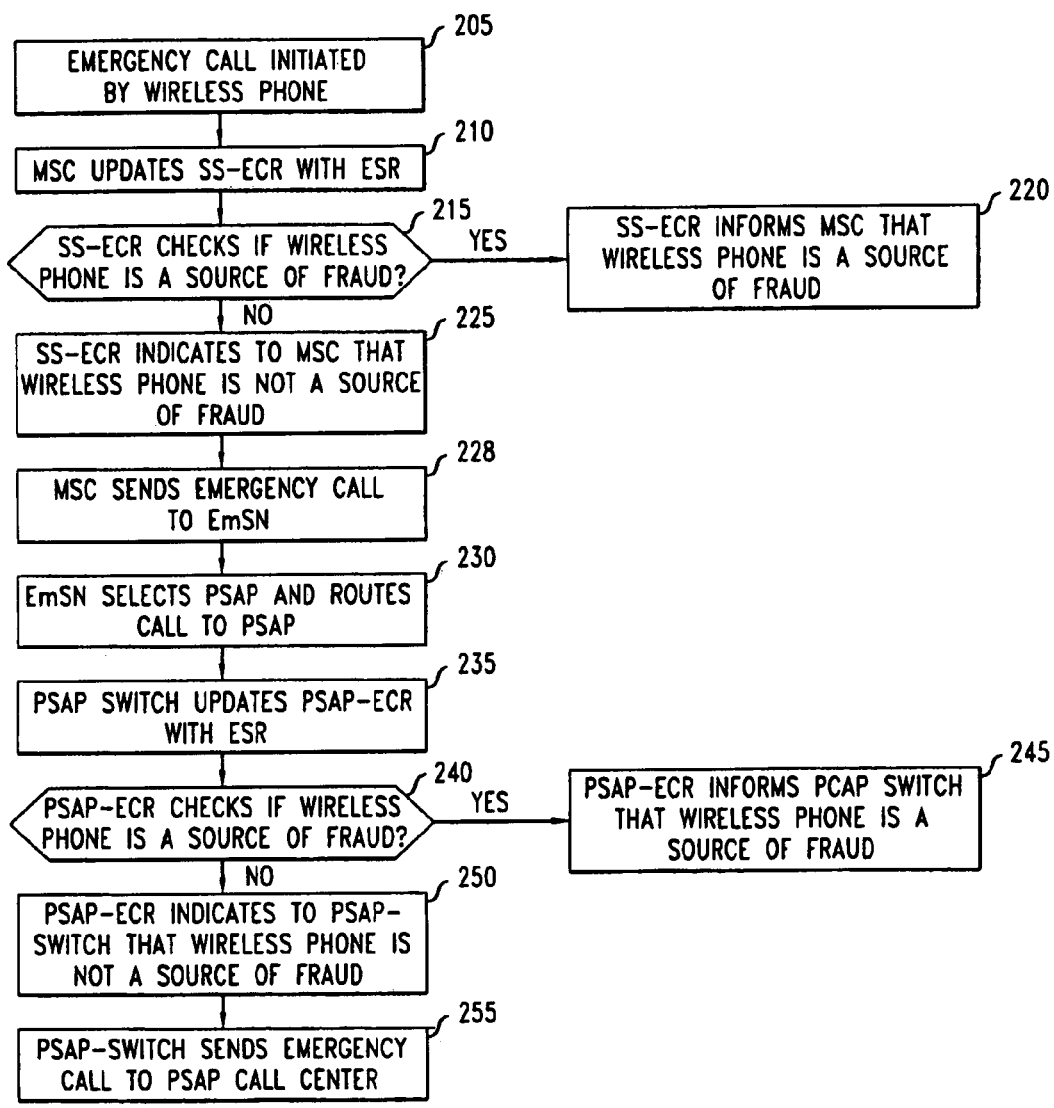
FIG. 2 depicts a flowchart illustrating network signaling operations in accordance with the present invention.

FIG. 2 depicts a flowchart 200 illustrating network signaling operations in accordance with the present invention. In step 205, an emergency call is initiated by a wireless phone 34. The emergency call includes a call origination message, a unique mobile equipment identity (MEID) and, perhaps, a mobile subscription identity (MSID) or a default mobile subscription identity (dMSID). The emergency call is sent over a $U_m$ interface from wireless phone 34 to base station 22, and subsequently over an A interface from base station 22 to MSC 24.

In step 210, MSC 24 updates SS-ECR 26 by sending a MSC ESR over an $E_x$ interface, wherein the MSC ESR includes information associated with the wireless phone 34 initiating the emergency call, such as MEID, a time at which the emergency call was received by wireless communications system 12 and, if available, MSID or DMSID. In step 215, SS-ECR 26 checks to determine if wireless phone 34 is a source of fraudulent emergency calls using the MEID and/or other information. If SS-ECR 26 determines wireless phone 34 is a source of fraudulent emergency calls, in step 220, SS-ECR 26 provides MSC 24 with a message over the $E_x$ interface indicating to MSC 24 that the call is or may be fraudulent. The message may include instructions for treating the emergency call. The instructions may be, for example, to send a recorded message to wireless phone 34 or to route the call to a fraud control center, wherein the recorded message may be a warning to the user of the wireless phone that it has been identified as a source of fraudulent calls.

If SS-ECR 26 determines wireless phone 34 is not a source of fraudulent emergency calls, in step 225, SS-ECR 26 provides MSC 24 with an indication that the call is not a fraudulent call. This indication may be in the form of a message over the $E_x$ interface or no response at all (or within some time interval). From step 225, the call is sent over an $A_i$ interface to EmSN 14, in step 228. The MEID and a calling party number (CGPN) associated with MSC 24 are signaled with the call to PSAP 16, wherein the MSC CgPN indicates a directory number (DN) associated with MSC 24. This particular CgPN is hereinafter referred to as a "Local Public Safety Callback Number (LPN)". In step 230, EMSN 14 selects the appropriate PSAP wo which the call should be routed based on the LPN. Alternately, EmSN 14 routes the call to PSAP 16 over the $A_i$ interface based on the called party number (CdPN) that has been translated from the digits used to initiate the emergency call (e.g., 911).

In step 235, PSAP Switch 28 receives the call and updates PSAP-ECR 30 by sending a PSAP ESR over an $E_z$ interface, wherein the PSAP ESR includes information associated with wireless phone 34 and MSC 24, such as MEID, LPN, and the time of the call. In step 240, PSAP-ECR 30 sends an LE ESR indicating the MEID and the time of call to LE 20 over an $E_b$ interface, and checks to determine if wireless phone 34 is a source of fraudulent emergency calls using the MEID and/or other information. Note that LE 20 has an associated emergency call register (LE-ECR).

Note that in one embodiment, a single ESR for a single emergency call generated with the call origination at the SS-ECR may be shared upward to the PSAP-ECR and the LE-ECR. Even if LE-ECR and SS-ECR generate new information for an MEID entry, such as flags if the MEID may be fraudulent or call treatment directions for the MSCs in the area, those flags need to be replicated at each level ECR so that there is consistent treatment of the next call. Therefore, while ECRs at different levels of the hierarchy may be different and need to be reconciled through the network signaling operations proposed in this invention, the ESR for a single call should be the same at each ECR in the hierarchy.

If PSAP-ECR 30 determines wireless phone 34 is a source of fraudulent emergency calls, in step 245, PSAP-ECR 30 provides PSAP Switch 28 with a message over the $E_z$ interface indicating to PSAP Switch 28 that the call is or may be fraudulent. The message may include instructions for treating the emergency call. The instructions may be, for example, to route the call to a fraud control center. The instructions may also include sending instructions to SS-ECR 26 over the $E_y$ interface directing SS-ECR 26 to indicate that wireless phone 34 is a source of fraudulent emergency calls or for MSC 24 to route the call to a fraud control center. Or the instructions may be to send instructions to MSC 24 directing MSC 24 to send a recorded message to wireless phone 34, wherein the such instructions sent to MSC 24 would be sent over an $A_{ix}$ interface via transport network 18.

If PSAP-ECR 30 determines wireless phone 34 is not a source of fraudulent emergency calls, in step 250, PSAP-ECR 30 provides PSAP Switch 28 with an indication that the call is not a fraudulent call. This indication may be in the form of a message over the $E_z$ interface or no response at all. From step 250, the call is sent over an $E_a$ interface to PSAP call center 32, in step 255. The LPN and the MEID are signaled with the call to PSAP call center 32, which answers the emergency call. If the emergency call is determined by PSAP call center 32 to be legitimate, then PSAP call center 32 can cause the record of the emergency call associated with the legitimate call (or all records of emergency calls associated with the legitimate caller) to be removed from PSAP-ECR 30.

If a second emergency call is initiated by the same wireless phone 34, the network signaling operations in flowchart 200 is repeated. If the second emergency call was received by a different wireless communications system or MSC and routed to the same PSAP 16, PSAP-ECR 30 and law enforcement database 20 would have a cumulative record of all emergency calls from wireless phone 34 but each of the emergency call registers (ECR) associated with the first and second wireless communications system or MSC would only have a record of one emergency call. The SS-ECRs may also be updated. If these are legitimate emergency calls, then there is no need to update the SS-ECR. However, if call is fraudulent, then PSAP-ECR will notify the SS-ECRs that mobile is making fraudulent calls.

Note that this is an important point that needs to be recognized. The call counting and time threshold are helpful in cases where a call drops before the PSAP Call Center can determine if the call is fraudulent. However, if the call goes through to a PSAP call center operator who dispatches a first responder (e.g., an ambulance) who reports back to the PSAP that it was a false alarm, then the PSAP operator flags the MEID in the PSAP-ECR which then updates the LE-ECR and the SS-ECR. If the emergency was a true emergency, then all flags on the MEID record are removed at the PSAP-ECR and all counting toward a fraud threshold is stopped at the PSAP-ECR. Such would be communicated through the network to the LE-ECR and the SS-ECR.

If the second emergency call was received by a different wireless communications system or MSC and routed to a different PSAP, law enforcement database 20 would have a cumulative record of all emergency calls from wireless phone 34 but each of the ECRs associated with the first and second PSAPs and wireless communications system or MSC would only have a record of one emergency call. In this situation, law enforcement database 20 may send an update message to PSAP-ECRs over the $E_b$ interface. Alternately, PSAP-ECRs may update other PSAP-ECRs over an $E_w$ interface. The PSAP-ECRs, may in turn, send an update message to SS-ECRs over the $E_y$ interface.

Upon receiving an ESR or an update message, an ECR updates its records of emergency calls to that it may perform fraud detection using pooled information. Determining whether a wireless phone is a source of fraudulent emergency calls, i.e., fraud detection, involves the use of at least one fraud threshold. The fraud threshold may, in one embodiment, indicate the number of emergency calls which may be completed by a wireless phone within a certain time period. For example, the fraud threshold might be five emergency calls within an hour. The fraud threshold would be set by PSAP 16 or a law enforcement agency associated with LE 20. Wireless communications system 12, MSC 24 or SS-ECR 26 may receive instructions from PSAP 16 or LE 20 to set the same fraud threshold.

In one embodiment, when any ECR identifies a wireless phone as being a source of fraudulent calls, that ECR may send an alert message directly or indirectly to other ECRs at all or some levels of the hierarchy indicating that particular wireless phone as being a source of fraudulent calls. Preferably, SS-ECRs do not communicate to other SS-ECRs. Rather, communication between SS-ECRs is done via the PSAP-ECR. For example, if a SSECR detects fraud, the SS-ECR may send the alert message over an $E_y$ interface to a PSAP-ECR belonging to a PSAP serving the wireless communications system to which SS-ECR belongs. The PSAP-ECR would, in turn, send the alert message to a law enforcement database over the $E_b$ interface. The PSAP-ECR may also send the alert message to other PSAP-ECRs over the $E_w$ interface. In addition, PSAP-ECRs may send the alert message to SS-ECRs over the $E_y$ interface. Upon receiving an alert message, the wireless phone identified in the alert message is flagged as a source of fraudulent calls at the ECR receiving the alert message.

In another example, if a PSAP-ECR detects fraud, the PSAP-ECR may send an alert message to LE 20 over $E_b$ interface and to other PSAP-ECRs over the $E_w$ interface. Alternately, the law enforcement database may forward the alert message to other PSAP-ECRs over the $E_b$ interface. The PSAP-ECR may also send the alert message to one or more SS-ECRs over the $E_y$ interface.

In another example, if LE 20 detects fraud, the law enforcement database may send instructions to PSAP-ECRs over the $E_b$ interface on how to handle emergency calls from a particular wireless phone, as identified by its MEID. This could result in the PSAP-ECR, through the $E_y$ interface, signaling the SS-ECR to treat all further emergency calls from that wireless phone in a particular manner.

When an ECR identifies a wireless phone as a source of fraudulent calls or receives an alert message identifying, the ECR sets a flag or some other indication of fraud associated with the identified wireless phone so that the wireless phone may be readily identified by the ECR as a source of fraudulent calls. The flag may be override by instructions from LE 20. Such instructions may be sent directly or indirectly to other ECRs.

In one embodiment, when LE 20 identifies a wireless phone as a source of fraudulent calls, the associated LE-ECR may communicate the identification to one or more PSAP-ECRs over the $E_b$ interface which, in turn, communicates the identification to one or more SS-ECRs over the $E_y$ interface.

Figure 3:
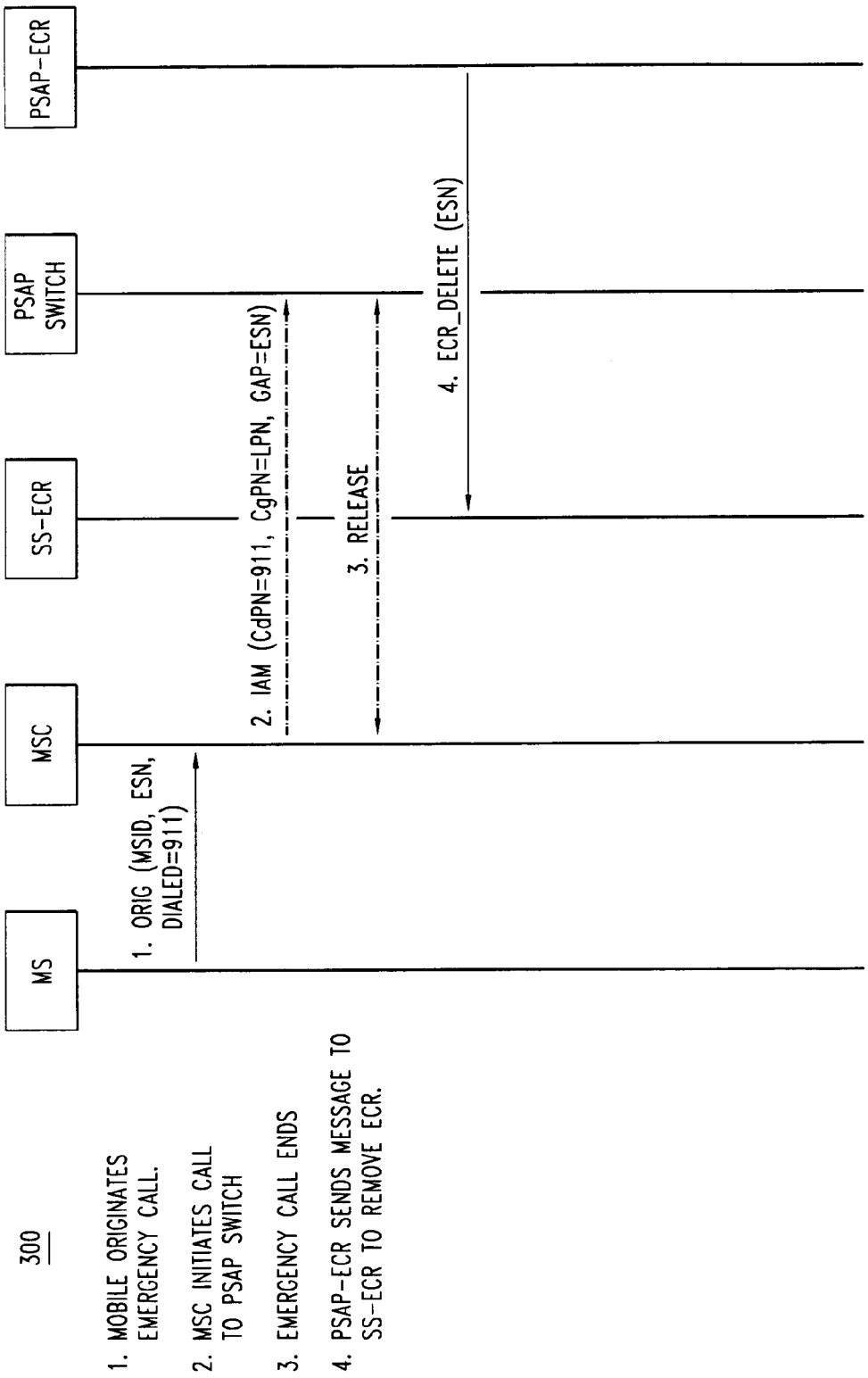
FIG. 3 depicts a flowchart illustrating network signaling operations for a PSAP-ECR removing record(s) of emergency call(s) from a SS-ECR.

FIGS. 3–10 depict flowcharts illustrating additional network signaling operations in accordance with the present invention. FIG. 3 depicts a flowchart 300 illustrating network signaling operations for a PSAP-ECR removing record (s) of emergency call(s) from a SS-ECR. A record of an emergency call (or all records of emergency calls) associated with a legitimate call is preferably removed from the ECRs after the call was determined to be legitimate thereby removing such record(s) from being counted against the fraud threshold.

Figure 4:
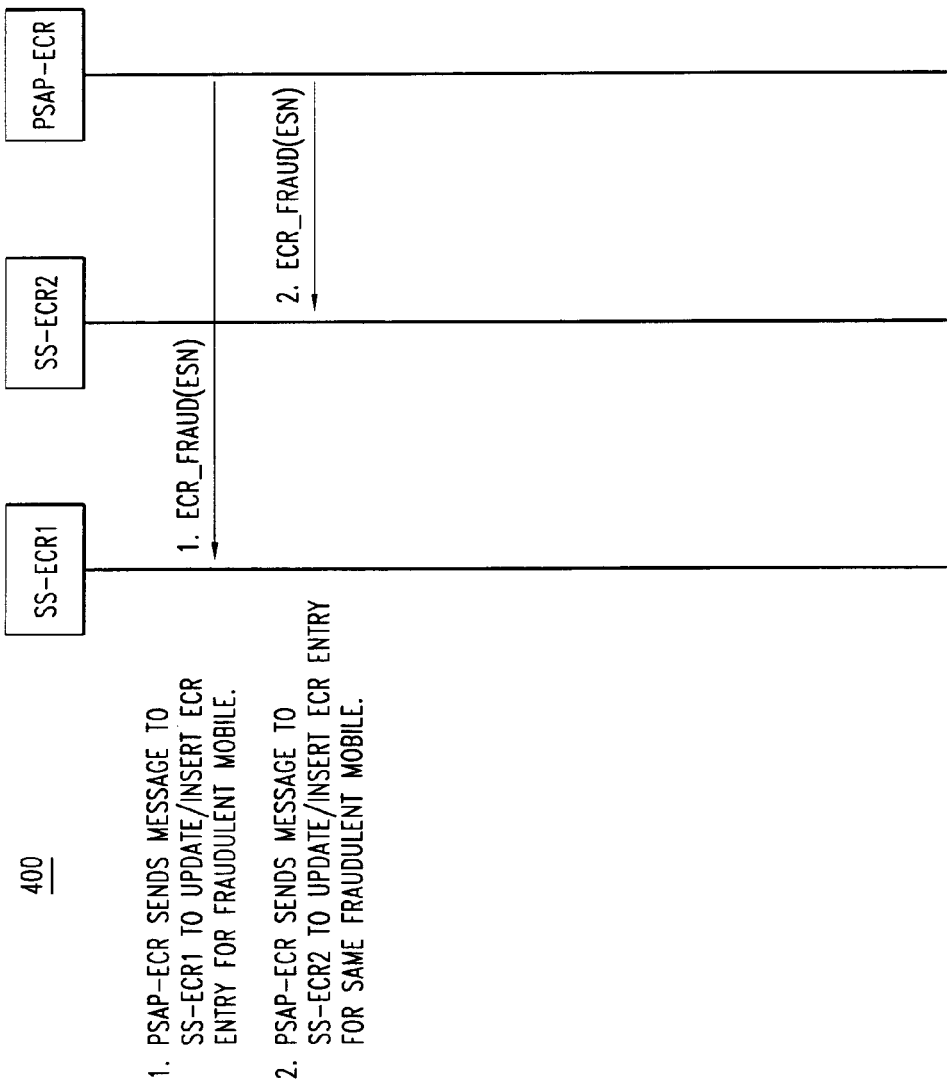
FIG. 4 depicts a flowchart illustrating network signaling operations for a PSAP-ECR flagging a wireless phone (e.g., sending an alert message) as fraudulent at one or more SS-ECRs within the serving area of the associated PSAP.

FIG. 4 depicts a flowchart 400 illustrating network signaling operations for PSAP-ECR 30 flagging a wireless phone (e.g., sending an alert message) as fraudulent at one or more SS-ECRs within the serving area of the associated PSAP. This set of network signaling operations is performed to warn such SS-ECRs emergency calls from a particular wireless phone may be treated a fraudulent even though the calls may have originated on other wireless communications systems.

Figure 5:
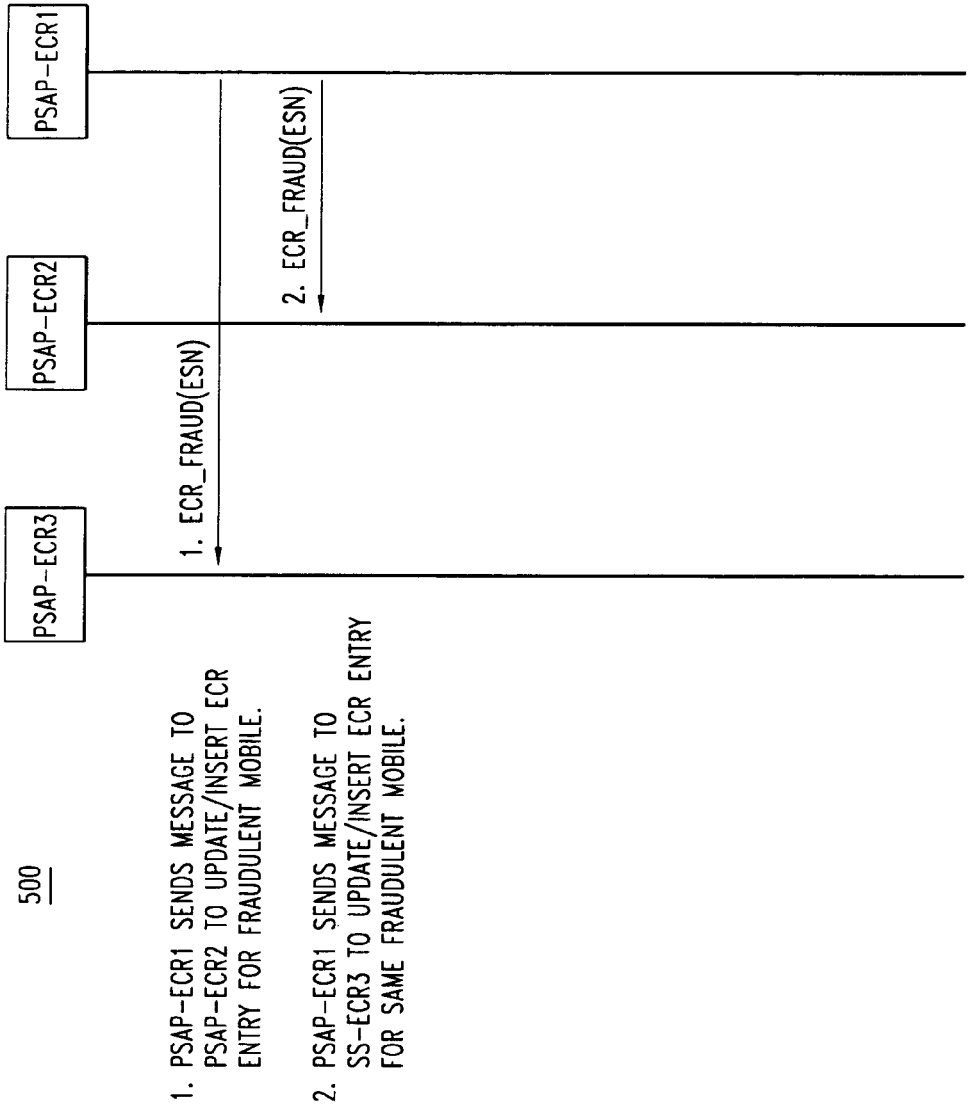
FIG. 5 depicts a flowchart illustrating network signaling operations for a PSAP-ECR flagging a wireless phone as fraudulent at other PSAP-ECRs.

FIG. 5 depicts a flowchart 500 illustrating network signaling operations for a PSAP-ECR flagging a wireless phone as fraudulent at other PSAP-ECRs. This set of network signaling operations is performed to warn other PSAP-ECRs in its network that emergency calls from a particular wireless phone may be treated as fraudulent even thought they were directed to a different PSAP.

Figure 6:
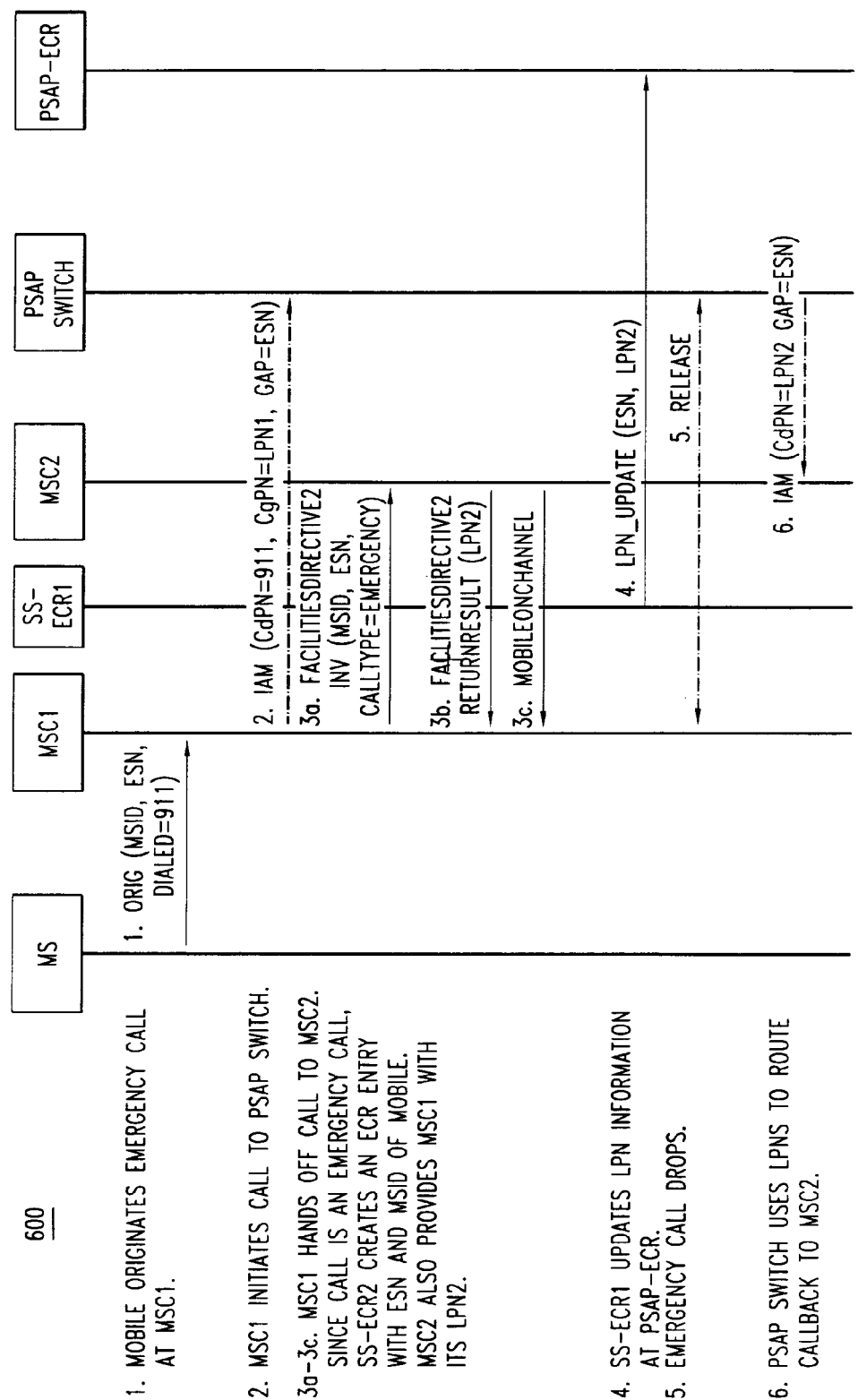
FIG. 6 depicts a flowchart illustrating network signaling operations for a SS-ECR providing a LPN update to a PSAP-ECR after an intersystem handoff.

FIG. 6 depicts a flowchart 600 illustrating network signaling operations for a SS-ECR providing a LPN update to a PSAP-ECR after an intersystem handoff. Suppose a wireless phone initiates an emergency call to a first MSC and the call drops. In this scenario, the PSAP can callback the wireless phone through the first MSC over the $A_{tx}$ interface. However, if the wireless phone initiates an emergency call in the first MSC during or before an intersystem handoff from the first MSC to a second MSC and the call drops, the PSAP would need to callback the wireless phone through the second MSC, not the first MSC. By providing an LPN update indicating the second MSC to the PSAP, the PSAP can call back the wireless phone through the proper MSC.

Figure 7B:
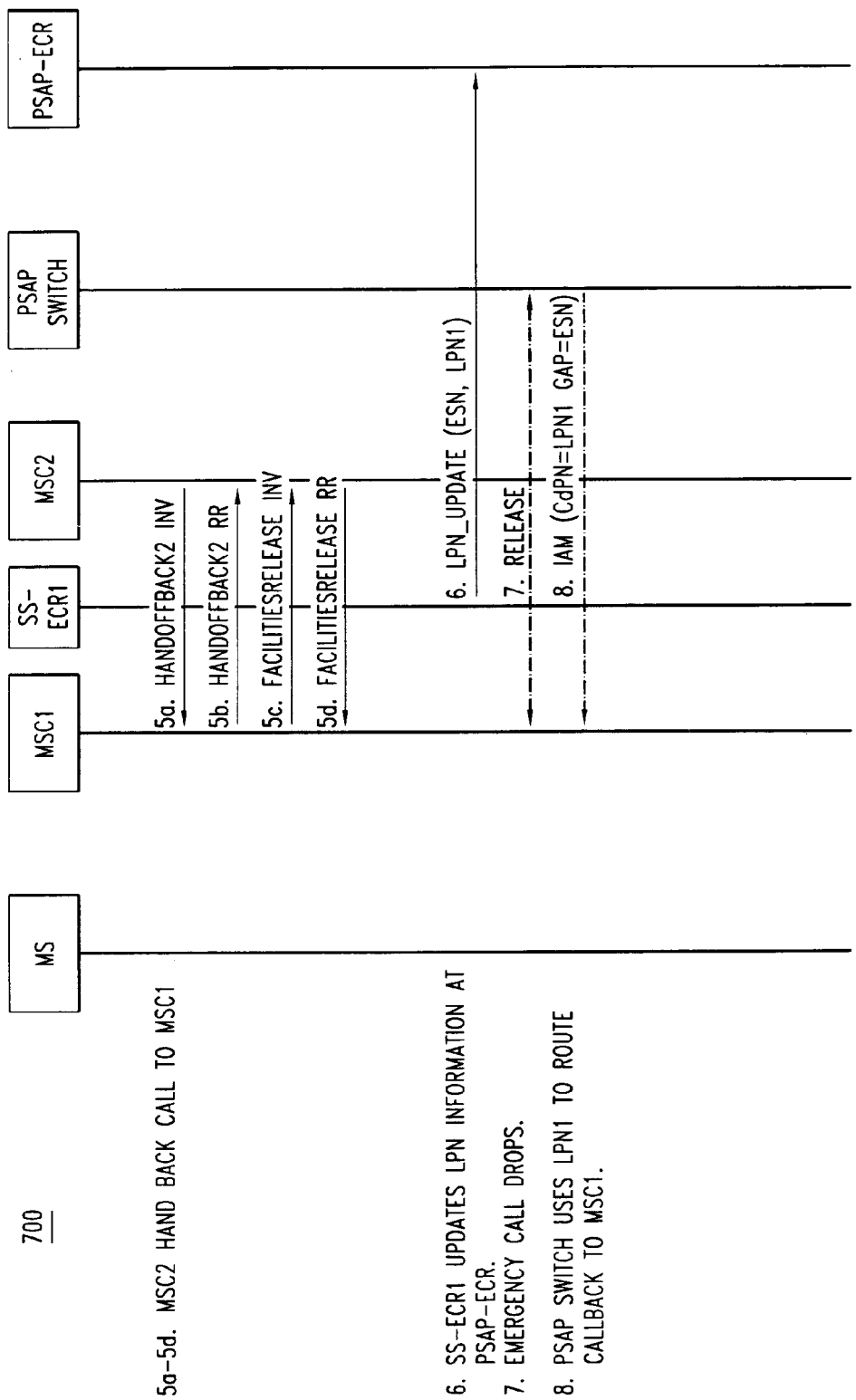
FIGS. 7 and 7a depict a flowchart illustrating network signaling operations for a SS-ECR providing a LPN update to PSAP-ECR after an intersystem handback.

FIGS. 7 and 7a depict a flowchart 700 illustrating network signaling operations for a SS-ECR providing a LPN update to PSAP-ECR after an intersystem handback. If a wireless emergency caller is handed back to the original serving system, this signaling provides the PSAP-ECR with the LPN of the current serving system for callback as needed.

FIG. 8 depicts a flowchart 800 illustrating network signaling operations for a SS-ECR providing a LPN update when a callback is delivered to a border serving MSC (i.e., MSC belonging to a border system), wherein a border system is one of a predetermined group of other wireless systems, the identity of which is determined by, for example, a network operator. New intersystem paging procedures allow for a wireless phone to be paged to deliver a callback in a border system if it is out of the serving area of the system from which the original emergency call was placed. This signaling allows the PSAP-ECR to be updated with the LPN of the current system controlling the call, i.e., the border system, while the callback is in progress.

FIG. 9 depicts a flowchart 900 illustrating network signaling operations for a SS-ECR providing a PSAP with alternate LPN. As an alternative to the network signaling operations of FIG. 8, the serving system may provide the PSAP-ECR with the LPN of the border system for callback. As the wireless phone may be moving between the original serving system and the border system, the PSAP may attempt a callback to both the border system and the original serving system.

FIG. 10 depicts a flowchart 1000 illustrating network signaling operations for a PSAP-ECR communicating with another PSAP-ECR to provide callback. The mobile phone may move from a serving system served by a first PSAP to a border system served by a second PSAP. This signaling allows for the second PSAP to originate a callback based on information from the first PSAP.

Although the present invention has been described in considerable detail with reference to certain embodiments, other versions are possible. Therefore, the spirit and scope of the present invention should not be limited to the description of the embodiments contained herein.

We claim:

1. A method of processing emergency call at a wireless communications network comprising the steps of:
   receiving an emergency call from a wireless phone being served by the wireless communications network;
   determining whether the wireless phone is a source of fraudulent calls;
   routing the emergency call to an emergency service network if the wireless phone is not identified as a source of fraudulent calls; and
   not routing the emergency call to the emergency service network if the wireless phone is identified as a source of fraudulent calls.

2. The method of claim 1, wherein the step of determining comprises checking if the wireless phone has been flagged as a source of fraudulent calls.

3. The method of claim 1, wherein the step of determining comprises checking if a number of emergency calls received from the wireless phone exceeds a fraud threshold.

4. The method of claim 3 comprising the additional step of:
receiving the fraud threshold from a public safety answering point or a law enforcement agency.

5. The method of claim 1 comprising the additional step of:
transmitting a message to the wireless phone that the wireless phone has been identified as a source of fraudulent calls or routing the emergency call to a fraud control center if the emergency call has been identified as a source of fraudulent calls.

6. The method of claim 1 comprising the additional step of:
receiving an alert message from a public safety answering point identifying one or more wireless phones as sources of fraudulent calls.

7. The method of claim 1 comprising the additional step of:
receiving instructions from a public safety answering point to route the emergency call to a fraud control center or to send a message to the wireless phone that the wireless phone has been identified as a source of fraudulent calls.

8. The method of claim 1 comprising the additional step of:
transmitting an alert message to a public safety answering point if the wireless phone is determined to be a source of fraudulent calls.

9. The method of claim 1 comprising the additional step of:
receiving instructions from a public safety answering point or a law enforcement agency to remove one or more records of emergency calls by one or more wireless terminals.

10. The method of claim 1 comprising the additional step of:
receiving instructions from a public safety answering point or a law enforcement agency to remove one or more flags identifying one or more wireless phones as a source of fraudulent calls.

11. A method of processing emergency calls at a public safety answering point comprising the steps of:
receiving an emergency call routed to it by a wireless communications network, wherein the emergency call was initiated by a wireless phone;
determining whether the wireless phone is a source of fraudulent calls;
routing the emergency call to a call center if the wireless phone is determined not to be a source of fraudulent calls; and
not routing the emergency call to the call center if the wireless phone is determined to be a source of fraudulent calls.

12. The method of claim 11, wherein the step of determining comprises checking if the wireless phone has been flagged as a source of fraudulent calls.

13. The method of claim 11, wherein the step of determining comprises checking if a number of emergency calls received from the wireless phone exceeds a fraud threshold.

14. The method of claim 11 comprising the additional step of:
transmitting instructions to the wireless communications network to send a message to the wireless phone that the wireless phone has been identified as a source of fraudulent calls or to route the emergency call to a fraud control center if the emergency call has been identified as a source of fraudulent calls.

15. The method of claim 11 comprising the additional step of:
routing the emergency call to a fraud control center if the emergency call has been identified as a source of fraudulent calls.

16. The method of claim 11 comprising the additional step of:
receiving an alert message from a law enforcement agency, a wireless communications network or another public safety answering point identifying one or more wireless phones as sources of fraudulent calls.

17. The method of claim 11 comprising the additional step of:
transmitting an alert message to the wireless communications network if the wireless phone is determined to be a source of fraudulent calls.

18. The method of claim 11 comprising the additional step of:
setting a fraud threshold at the public safety answering point to use in determining whether a wireless terminal is a source of fraudulent calls.

19. The method of claim 11 comprising the additional step of:
transmitting a fraud threshold to the wireless communications network to be used by the wireless communications network to determine if a wireless phone is a source of fraudulent calls.

20. The method of claim 11 comprising the additional step of:
transmitting a message to the wireless communications network to remove one or more flags identifying one or more wireless phones as being sources of fraudulent calls.

* * * * *